US011705757B2

(12) United States Patent
Leutgeb et al.

(10) Patent No.: US 11,705,757 B2
(45) Date of Patent: Jul. 18, 2023

(54) CAPACITIVE COUPLING DEVICE, CAPACITIVE COUPLING SYSTEM AND METHOD FOR OPERATING A CAPACITIVE COUPLING DEVICE

(71) Applicant: Infineon Technologies AG, Neubiberg (DE)

(72) Inventors: Thomas Leutgeb, Lieboch (AT); Josef Haid, Graz (AT)

(73) Assignee: Infineon Technologies AG, Neubiberg (DE)

( * ) Notice: Subject to any disclaimer, the term of this patent is extended or adjusted under 35 U.S.C. 154(b) by 134 days.

(21) Appl. No.: 17/333,244

(22) Filed: May 28, 2021

(65) Prior Publication Data

US 2021/0376659 A1 Dec. 2, 2021

(30) Foreign Application Priority Data

May 29, 2020 (DE) .......................... 102020114501.2

(51) Int. Cl.
*H02J 50/05* (2016.01)
*H02J 50/80* (2016.01)
*H02J 50/40* (2016.01)

(52) U.S. Cl.
CPC .............. *H02J 50/05* (2016.02); *H02J 50/80* (2016.02); *H02J 50/402* (2020.01)

(58) Field of Classification Search
None
See application file for complete search history.

(56) References Cited

U.S. PATENT DOCUMENTS

| 2009/0302690 | A1* | 12/2009 | Kubono | .................. H02J 50/40 |
| | | | | 307/109 |
| 2014/0339903 | A1* | 11/2014 | Goma | .................. H04B 5/0025 |
| | | | | 307/85 |
| 2015/0243442 | A1* | 8/2015 | Kanno | ..................... H01G 7/00 |
| | | | | 361/278 |
| 2021/0021160 | A1* | 1/2021 | Bartlett | ................... H02J 50/20 |

* cited by examiner

*Primary Examiner* — Jared Fureman
*Assistant Examiner* — Joel Barnett
(74) *Attorney, Agent, or Firm* — Banner & Witcoff Ltd.

(57) ABSTRACT

A capacitive coupling device for capacitive coupling to a capacitive coupling means which is arrangeable on the capacitive coupling device. The capacitive coupling device can have a first coupling surface, which has at least three coupling surface segments which are arranged separated from one another, a voltage supply configured to provide a first supply voltage and a second supply voltage which is different therefrom, and a control circuit, which is arranged to connect each of the coupling surface segments selectively to the first supply voltage or to the second supply voltage in an electrically conductive manner or to disconnect it from the control circuit in such a way that the coupling surface segments connected to the first supply voltage form, with a first coupling surface area of the capacitive coupling means, a first capacitor, and the coupling surface segments connected to the second supply voltage form, with a second coupling surface area of the capacitive coupling means, a second capacitor.

22 Claims, 6 Drawing Sheets

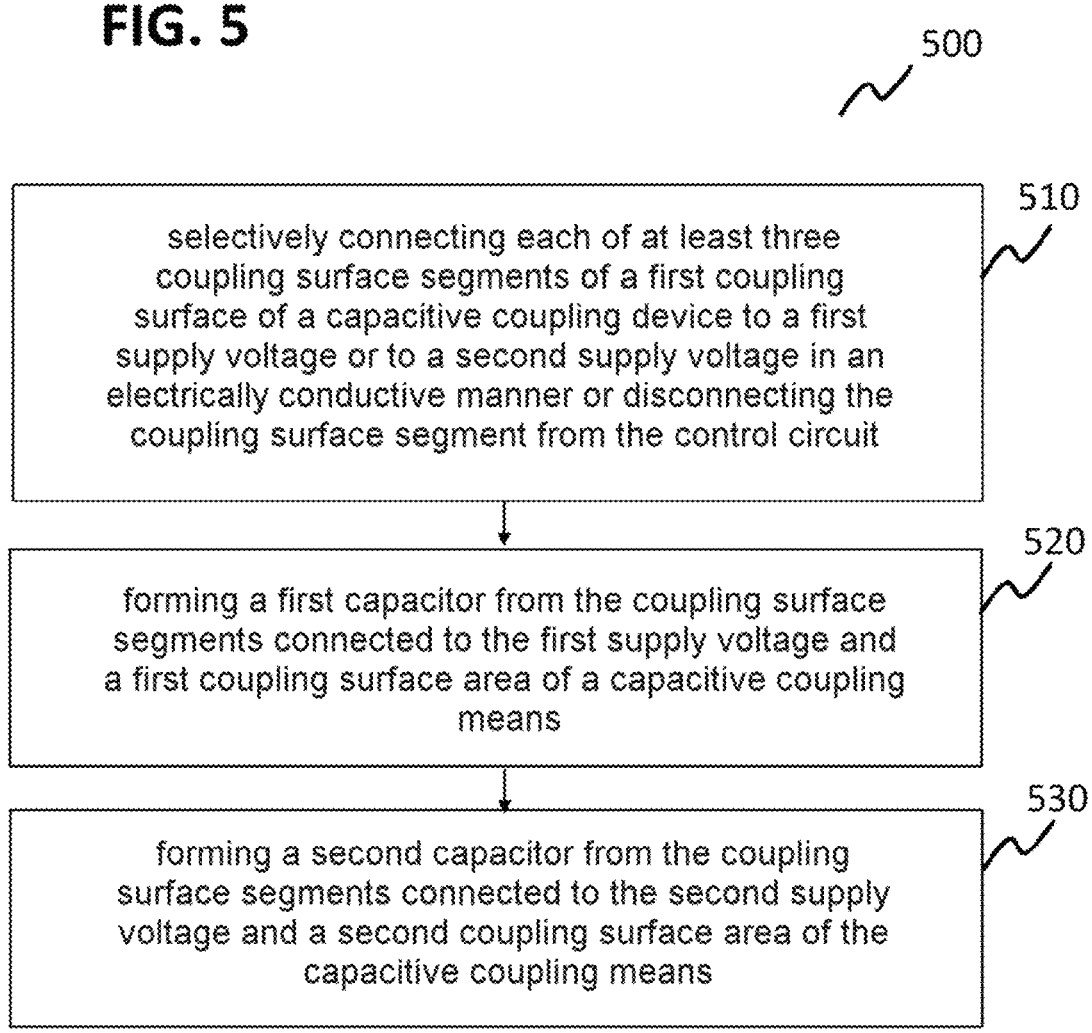

CAPACITIVE COUPLING DEVICE, CAPACITIVE COUPLING SYSTEM AND METHOD FOR OPERATING A CAPACITIVE COUPLING DEVICE

TECHNICAL FIELD

This disclosure relates to a capacitive coupling device, a capacitive coupling system and a method for operating a capacitive coupling device.

BACKGROUND

In the case of communication systems which are based on a capacitive electromagnetic coupling, it is very important that a coupling means (or rather its coupling surfaces) is (or are) positioned correctly on a coupling device (also referred to as a reading device).

An energy and/or data transmission may otherwise be weakened or may even be impossible.

Incorrect positioning may result in maloperation by a user, a manufacturing tolerance, or both.

This is one reason why capacitive communication systems are currently either dispensed with or use up more energy than necessary during their operation to provide a buffer which can compensate for a weak coupling in the case of suboptimal positioning. Imposing a design with a precise positioning would require a relatively significant amount of effort in production and therefore result in relatively high costs.

SUMMARY

In various exemplary aspects, a capacitive coupling device is provided which has a segmented coupling surface. Each of the segments can be selectively connectable to one of two supply voltages (or to ground), which makes it possible to accurately (more or less, depending on granularity) map a geometry of coupling surface areas of a coupling means which is to be coupled. In this case, "geometry" may relate to a shape of the coupling surface areas, to a relative arrangement of the coupling surface areas with respect to the coupling surface segments, or to both.

The segmented coupling surface can have at least three coupling surface segments in various exemplary aspects.

In various exemplary aspects, the coupling surface segments can be arranged in a matrix form.

In various exemplary aspects, switches can be provided for selectively connecting each of the individual coupling surface segments to a first supply voltage, a second supply voltage (or to ground) or switching to an unconnected state.

In various exemplary aspects, a coupling capacitance—and correspondingly an efficiency of an energy transmission of the capacitive coupling device—can thus be or become maximized.

In the case of an approach of a capacitive coupling means to the capacitive coupling device, a control circuit can be set up, as a test, to connect the coupling surface segments to the first supply voltage or the second supply voltage or to switch to the unconnected state and, in this case, to carry out a capacitance measurement, in order to maximize a total capacitance.

In various exemplary aspects, a capacitive coupling device is provided for capacitive coupling to a capacitive coupling means which can be arranged on the capacitive coupling device. The capacitive coupling device can have a first coupling surface, which has at least three coupling surface segments which are arranged separated from one another, a voltage supply for providing a first supply voltage and a second supply voltage which is different therefrom, and a control circuit, which is set up to connect each of the coupling surface segments selectively to the first supply voltage or to the second supply voltage in an electrically conductive manner or to disconnect it from the control circuit in such a way that the coupling surface segments connected to the first supply voltage form, with a first coupling surface area of the capacitive coupling means, a first capacitor, and the coupling surface segments connected to the second supply voltage form, with a second coupling surface area of the capacitive coupling means, a second capacitor.

In various exemplary aspects, the capacitive coupling device can be designed as an electronic inhalation device or can form a part of an electronic inhalation device. The capacitive coupling means can be designed as a container for a (for example liquid) inhalant.

In various exemplary aspects, the capacitive coupling device can be designed as a printer or comparable electronic device which is provided with consumables which are to be authenticated. The capacitive coupling means can be designed as a container for the consumable, for example as a toner cartridge or ink cartridge.

The capacitive coupling device can be set up to supply the capacitive coupling means with energy for an authentication process and to carry out an authentication of the capacitive coupling means by means of a communication.

In various exemplary aspects, the capacitive coupling device can make it possible to manufacture the capacitive coupling means with relatively high tolerances in the positioning of the coupling surface areas, which can be advantageous in particular if the capacitive coupling means is a mass product, such as a storage container for inhalation liquid or a toner cartridge.

BRIEF DESCRIPTION OF THE DRAWINGS

Exemplary aspects of the disclosure are represented in the figures and are explained in greater detail hereinafter.

In the figures,

FIG. 5 shows a flow diagram of a method for operating a capacitive coupling device according to various exemplary aspects.

DETAILED DESCRIPTION

In the subsequent detailed description, reference is made to the accompanying drawings which form part thereof and in which, for illustrative purposes, specific aspects are shown in which the disclosure can be applied. In this context, directional terminology is used, such as "above", "below", "in front", "behind", "front", "rear", etc. with respect to the orientation of the described figure(s). Since components from aspects can be positioned in a number of different orientations, the directional terminology is used for illustrative purposes and is in no way restrictive. It is understood that other aspects may be used and structural or logical changes may be carried out without deviating from the scope of protection of the present disclosure. It is understood that the features of the various exemplary aspects described herein can be combined with one another, unless specifically stated otherwise. The subsequent detailed description should therefore not be understood in a restrictive sense, and the scope of protection of the present disclosure is defined by the attached claims.

Within the context of this description, the terms "connected", "joined" and "coupled" are used for describing both a direct and an indirect connection, a direct or indirect joining and a direct or indirect coupling. Identical or similar elements are provided with identical reference numbers in the figures, as far as this is appropriate.

Figure 1A:
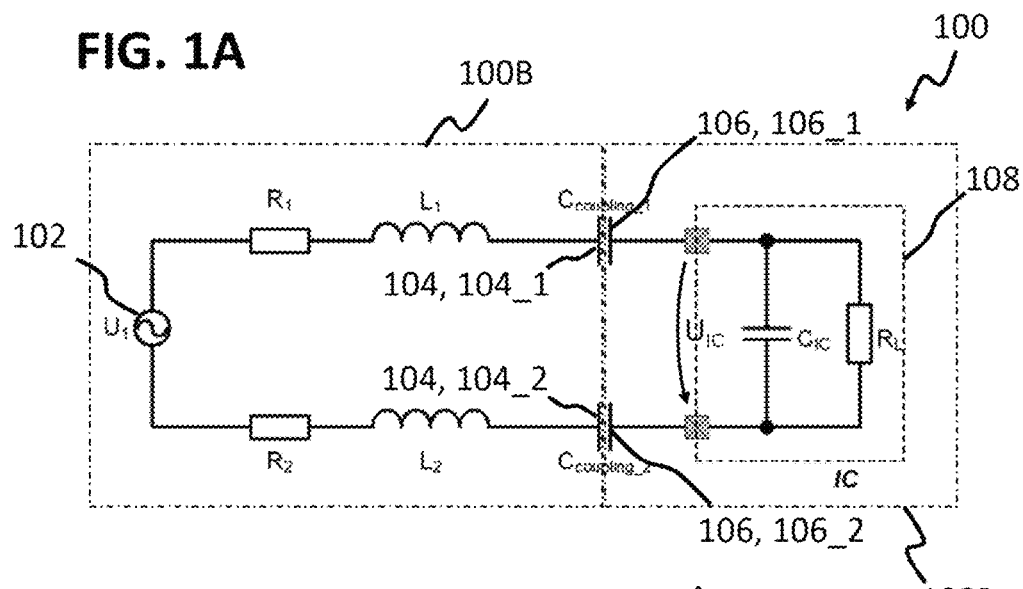
FIGS. 1A to 1C show schematic representations of a known capacitive coupling system.
Figure 1B:
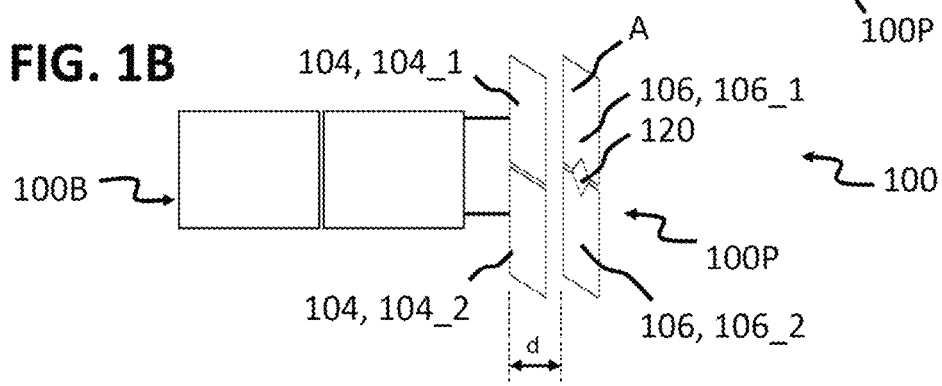
Figure 1C:
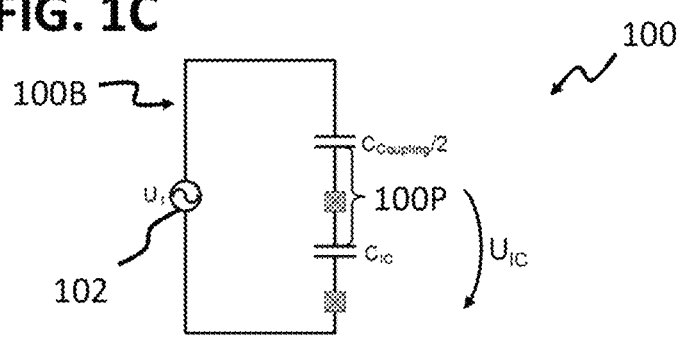

FIG. 1A to FIG. 1C show schematic representations of a known capacitive coupling system 100.

The capacitive coupling system 100 has a capacitive coupling device 100B which has a voltage supply 102 (for alternating voltage), a first coupling field 104_1 and a second coupling field 104_2.

Furthermore, the capacitive coupling system 100 has a capacitive coupling means 100P which is set up to couple with the capacitive coupling device 100B. The capacitive coupling means 100P has a first coupling surface area 106_1 and a second coupling surface area 106_2 which can be connected to one another by means of a non-galvanic connector 120. The first coupling surface area 106_1 and the second coupling surface area 106_2 can each have an (effective) area A. The coupling surface areas 106 and the coupling fields 104 can be arranged at a distance d from one another.

A coupling capacitance $C_{Coupling}$ then results from:

$$C_{Coupling} = \varepsilon_0 \varepsilon_r \frac{A}{d}$$

In the example represented, the effective surface A corresponds to the mapped geometrical surface, since the coupling surface areas 106_1, 106_2 are precisely opposite their respective counterparts, the coupling fields 104_1 or 104_2.

If the coupling surface areas 106_1, 106_2 are offset from their respective counterparts, the coupling fields 104_1 or 104_2, this reduces the effective surface A and thus the coupling capacitance $C_{Coupling}$.

Conversely, the coupling capacitance $C_{Coupling}$ is proportional to its associated reactance $X_{Coupling}$. Since a voltage $U_{IC}$, which can be applied to an integrated circuit IC by means of the coupling surface areas 106_1, 106_2, results from $$U_{IC} = U_1 \frac{X_{IC}}{X_{IC} + 2 \cdot X_{Coupling}}$$

(with the reactance $X_{IC}$ of the circuit IC), a voltage at the integrated circuit IC is maximized by a coupling capacitance $C_{Coupling}$ which is as high as possible.

In various exemplary aspects, a capacitive coupling device 200 is provided in which a coupling capacitance $C_{Coupling}$—and correspondingly a voltage $U_{IC}$ at the coupled integrated circuit IC and therefore an efficiency of an energy transmission of the capacitive coupling device 200—is or will be increased, for example maximized.

FIG. 2A, FIGS. 2B, 3 and 4 each show schematic representations of a capacitive coupling system 200 according to various exemplary aspects.

The capacitive coupling system 200 can have a capacitive coupling device 200B and a capacitive coupling device for capacitive coupling to a capacitive coupling means 100P which can be arranged on the capacitive coupling device 200B.

The capacitive coupling means 100P can have a similar or the same design as the capacitive coupling means 100P of the capacitive coupling system 200. Correspondingly, the capacitive coupling device 200B can be designed in such a way that it can increase or maximize the efficiency of the energy transmission to the capacitive coupling means 100P when coupling with a (for example any) capacitive coupling means 100P, without having to change the capacitive coupling means 100P. In various exemplary aspects, the capacitive coupling means 100P can have a different design than that which is currently known.

The capacitive coupling device 200B, for capacitive coupling to the capacitive coupling means 100P which can be arranged on the capacitive coupling device 200B, can have a first coupling surface 204, which has at least three coupling surface segments 204_1, 204_2, . . . , 204_N (N being greater than or equal to 3) which can be arranged separated from one another. In this case, separated is intended to be understood to mean that the coupling surface segments 204_1, 204_2, . . . , 204_N are not in direct contact with one another. Instead, the coupling surface segments 204_1, 204_2, . . . , 204_N can be electrically insulated from one another within a plane in which they are arranged, for example by means of a dielectric arranged between them, for example a polymer, or air, for example. The coupling surface segments 204_1, 204_2, . . . , 204_N can be connectable to one another in an electrically conductive manner, for example by means of electrical connections on a (rear) side of the coupling surface segments 204_1, 204_2, . . . , 204_N which is facing away from an area in which the capacitive coupling device 200B is arranged.

In various exemplary aspects, the capacitive coupling device 200B can have a voltage supply 102 for providing a first supply voltage V1 and a second supply voltage V2 which is different therefrom. In this case, the term "supply voltage" is intended to be understood to include a ground connection. The first supply voltage V1 and the second supply voltage V2 can be provided as an alternating voltage.

In various exemplary aspects, the capacitive coupling device 200B can have a control circuit 332. The control circuit 332 can be a microprocessor, for example.

Figure 3:
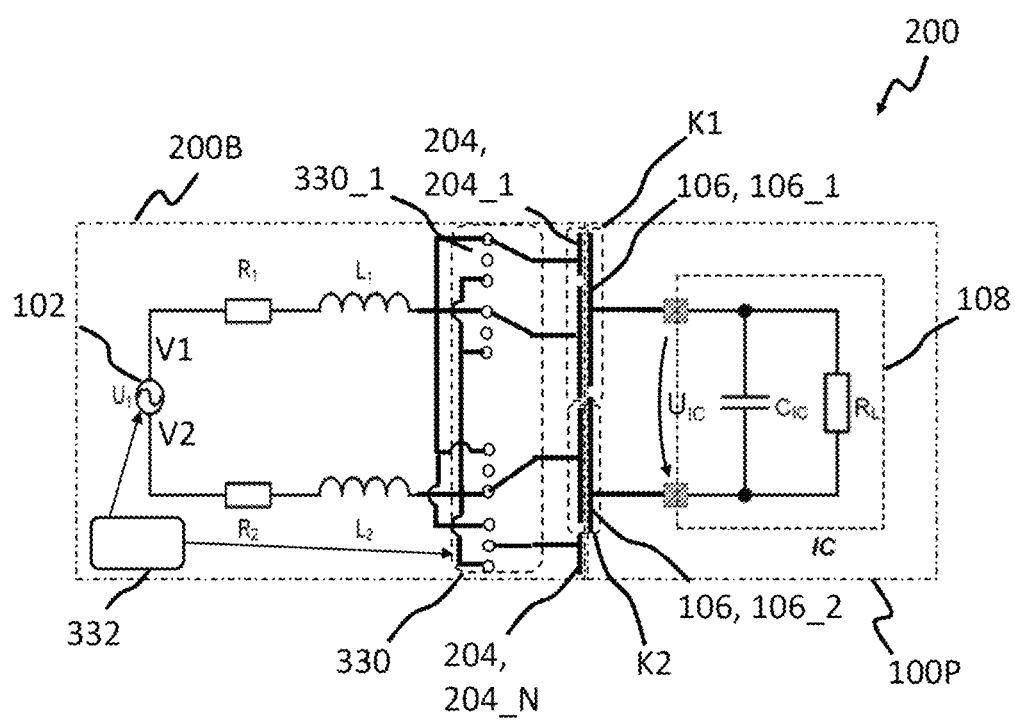
FIG. 3 shows a schematic representation of a capacitive coupling system according to various exemplary aspects.

The control circuit 332 can be set up to connect each of the coupling surface segments 204 selectively to the first supply voltage V1 or to the second supply voltage V2 in an electrically conductive manner or to disconnect it from the control circuit 332, for example by means of the switch 330. In other words, the control circuit 332 can be set up to bring each of the coupling surface segments 204 selectively into one of three switching states. This is illustrated in FIG. 3 by means of an arrow from the control circuit 332 to the switches 330.

This makes it possible to achieve that the coupling surface segments 204 connected to the first supply voltage V1 form, with a first coupling surface area 106_1 of the capacitive coupling means 100P, a first capacitor K1, and the coupling surface segments 204 connected to the second supply voltage V2 form, with a second coupling surface area 106_2 of the capacitive coupling means 100P, a second capacitor K2.

Providing the at least three coupling surface segments 204 can make it possible to connect one of the coupling surface segments 204 to the first supply voltage V1, a second one of the coupling surface segments 204 to the second supply voltage V2, and a third one of the coupling surface segments 204 (for example the coupling surface segment which is arranged between the first and the second coupling surface segment) selectively to the first supply voltage V1 or the second supply voltage V2, or to leave it unconnected, in order to maximize the total capacitance.

By means of the capacitive coupling, energy can be provided to the capacitive coupling means 100P from the voltage supply 102, for example according to the principle described previously for the capacitive coupling system 100. Moreover, data can be exchanged between the capacitive coupling device 200B and the capacitive coupling means 100P, for example as a modulated signal.

Figure 2A:
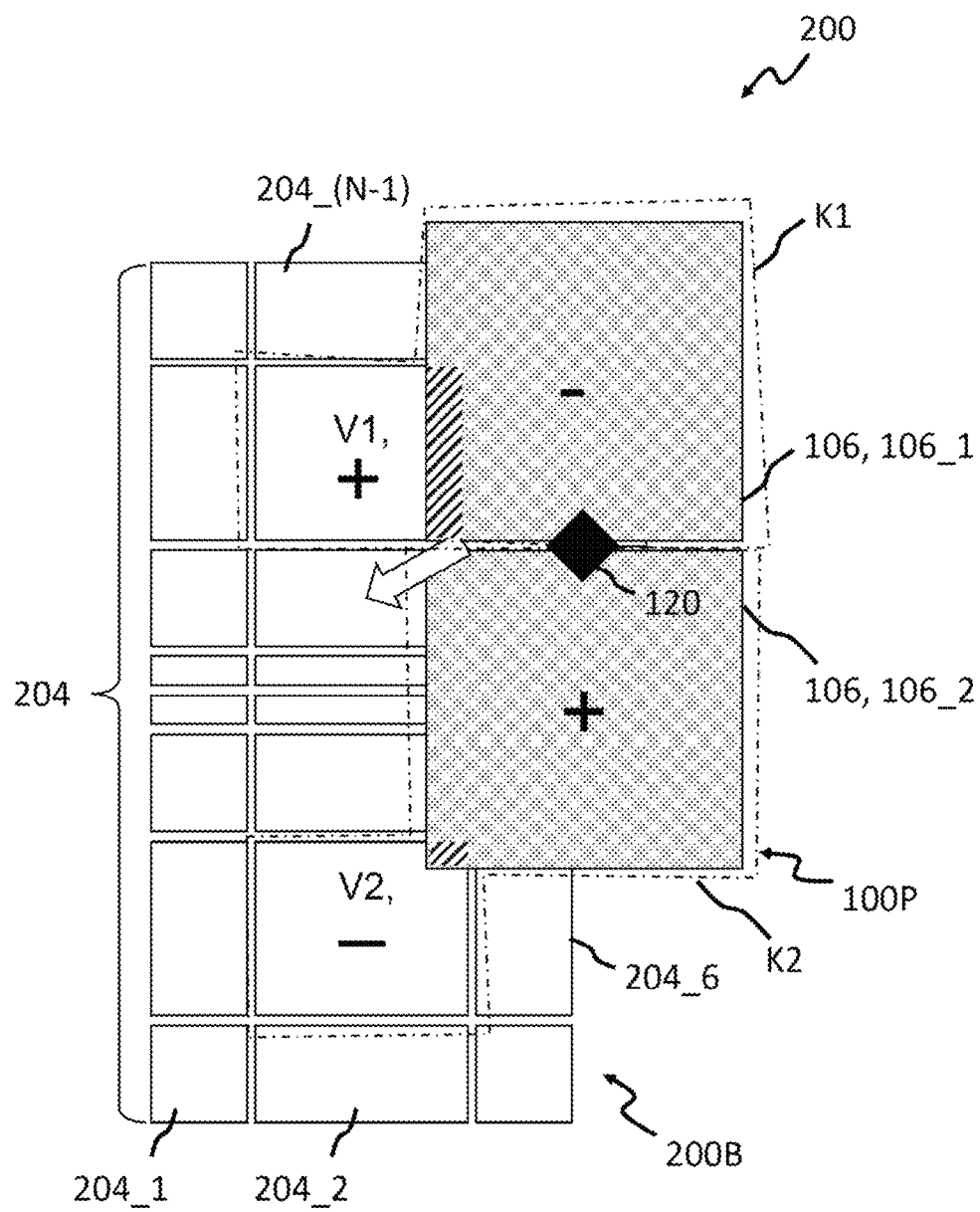
FIGS. 2A and 2B show schematic representations of a capacitive coupling system according to various exemplary aspects.
Figure 2B:
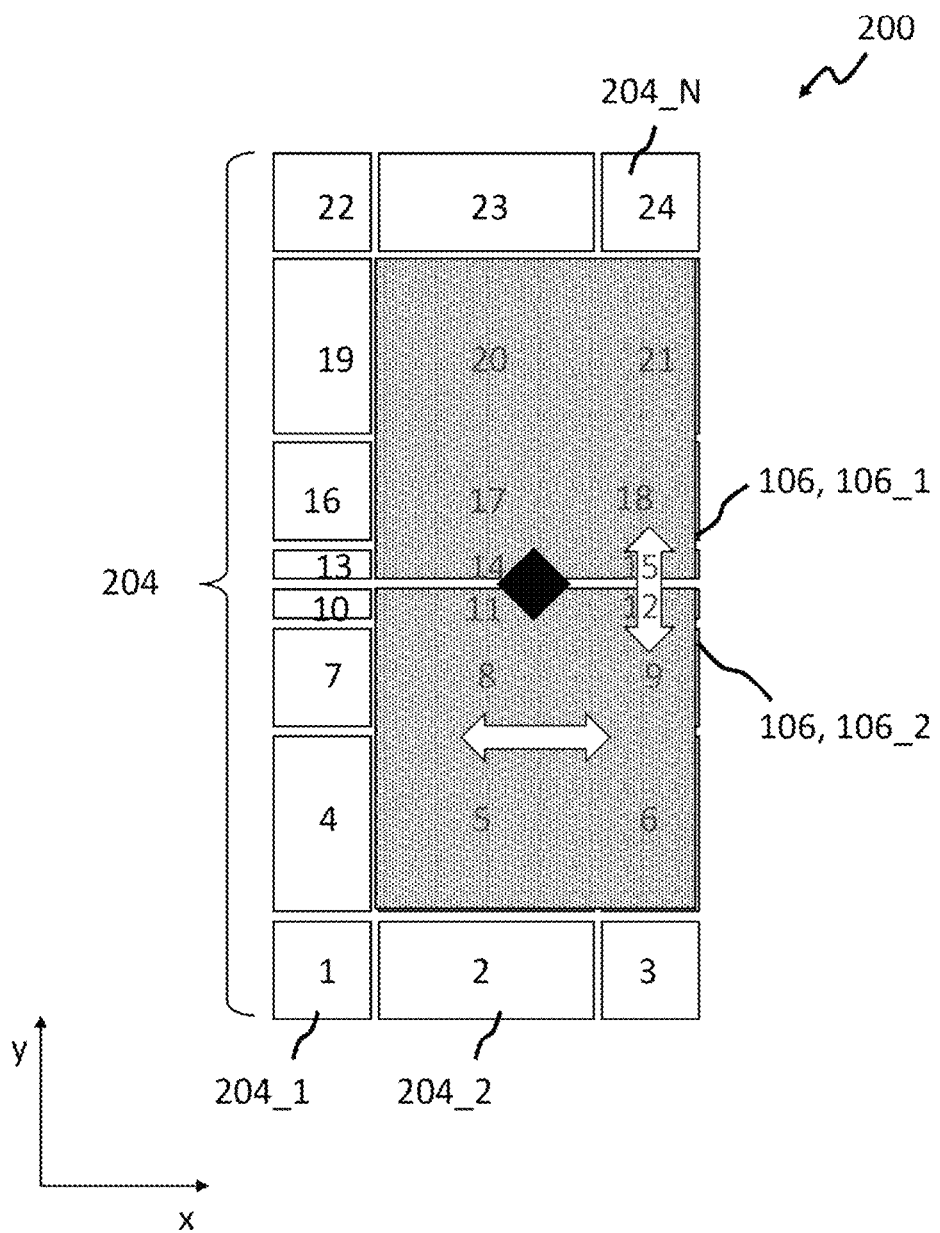

FIGS. 2A and 2B illustrate how the capacitive coupling, controlled by means of the control circuit 332, can take place.

The control circuit 332 can be set up to detect an approach of the capacitive coupling means 100P (see FIG. 2A), for example by means of the capacitive coupling device 200B itself, by means of an additional contactless sensor, by means of a contact sensor, or the like.

Figure 4:
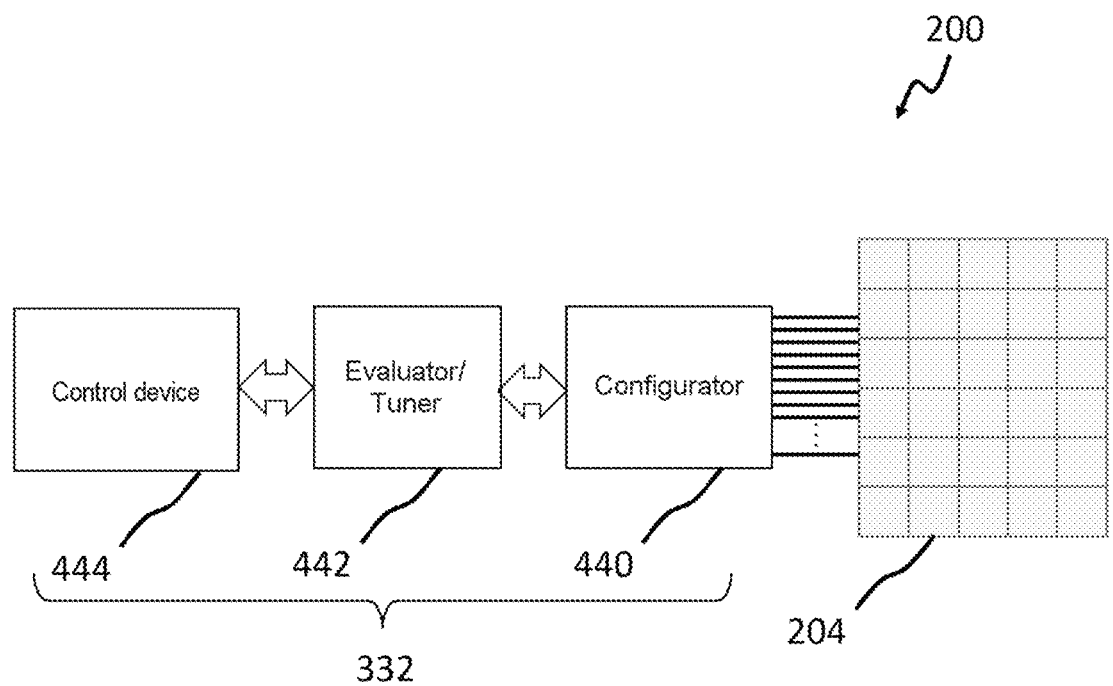
FIG. 4 shows a schematic representation of a capacitive coupling system according to various exemplary aspects.

The control circuit 332 can further be set up to bring the capacitive coupling device 200B into a configuration mode and to operate it in the configuration mode, for example by means of functional units, for example a control device 444, an evaluator/tuner 442 and a configurator 440 (see, for example, FIG. 4).

The evaluator/tuner 442 can be set up to carry out an evaluation of a configuration which is present in the configuration mode based on technical parameters, for example based on transmission efficiency and/or based on performance in an intended application, which can be run as a test, for example. Performance can be determined, for example, based on execution time (the shorter the execution time, the better the energy transmission and the communication stability).

The configuration mode can be a mode of operation (e.g. activated by means of the control device 444) in which the control circuit 332 (e.g. by means of the configurator 440) firstly brings each of the coupling surface segments 204 into one of the possible switching states, determines (e.g. by means of the evaluator/tuner 442) a total capacitance of the capacitors K1 and K2 (i.e. a sum C1+C2 of the capacitances of the first capacitor K1 and the second capacitor K2), and then tests out all three switching states for at least one of the coupling surface segments 204 and determines the total capacitance in each case.

In various exemplary aspects, in addition to the total capacitance, a signal quality can be determined and can be considered for establishing a configuration for a normal operation. This is because coupling surface segments 204 which are connected to one of the supply voltages V1, V2 in an electrically conductive manner but have no overlap to one of the coupling surface areas 106 leave the total capacitance substantially unchanged but impair a signal quality (for example as a result of parasitic capacitances). Correspondingly, it may be desirable in various exemplary aspects to select that configuration for normal operation in which the maximum total capacitance C1+C2 is reached with the smallest possible number of coupling surface segments 204 which are connected to the voltage supply 104 in an electrically conductive manner, or the total capacitance C1+C2 is maximized together with the signal quality.

FIG. 2A and FIG. 2B, which can be regarded as successive states, illustrate an exemplary aspect. Of the capacitive coupling means 100P and the capacitive coupling device 200B, for the sake of clarity, only the coupling surface areas 106 or the coupling surface segments 204 are represented. Upon detecting an approach of the capacitive coupling means 100P (see arrow direction in FIG. 2A) to the capacitive coupling device 200B, for example by means of a change in impedance caused by the capacitive coupling means 100P, the capacitive coupling device 200B is switched to the configuration mode (for example by the configurator 440).

In an initial configuration, a first one of the coupling surface segments 204, for example the coupling surface segment 204_20 (see numbering in FIG. 2B, for the sake of better clarity, the "204_" is dispensed with in each case), can be connected, for example, to the first supply voltage V1 by means of an associated switch 330_20 from a plurality of switches 330. The first supply voltage V1 is represented as + by way of example.

In the initial configuration, a second one of the coupling surface segments 204, for example the coupling surface segment 204_5, can be connected, for example, to the second supply voltage V2 by means of an associated switch 330_5. The second supply voltage V2 is represented as — by way of example.

In various exemplary aspects, the remaining coupling surface segments 204 can be switched to the "disconnected" state in the initial configuration.

The first coupling surface segment 204_20 can be selected in such a way, for example, that even in the case of a maximum shifted placement of the capacitive coupling means 106 with respect to the capacitive coupling device 104, it is at least partially covered by a first coupling surface area 106_1 of the coupling surface areas 106.

The second coupling surface segment 204_5 can be selected in such a way, for example, that even in the case of a maximum shifted placement of the capacitive coupling means 106 with respect to the capacitive coupling device 104, it is at least partially covered by a second coupling surface area 106_2 of the coupling surface areas 106.

As illustrated using the markings with reversed polarity in the coupling surface areas 106, the first coupling surface segment 204_20 forms, with the first coupling surface area 106_1, the first capacitor K1, and the second coupling surface segment 204_20 forms, with the second coupling surface area 106_2, the second capacitor K2. However, a total capacitance C1+C2 is still small in the approach phase, since the effective capacitor surface only includes the shaded areas in which the coupling surface segments 204_20, 204_5 connected to one of the supply voltages V1 or V2 overlap the coupling surface areas 106_1 or 106_2 in each case.

Depending on an intended use, for example a most likely position of the coupling surface areas 106, a different initial configuration may be selected.

The control circuit 332, for example the control device 444, can be set up in various exemplary aspects to maintain the initial configuration until the measured total capacitance no longer changes, i.e. until a positioning of the capacitive coupling means 100P on the capacitive coupling device 200B is complete. In various exemplary aspects, a measurement of the capacitance can take place indirectly, for example based on a transmission efficiency (which can be influenced by a voltage which is present at the capacitive coupling means 100P, a communication stability, etc.).

The control circuit 332, for example the control device 444, can be set up in various exemplary aspects to already start adjusting the configuration during the positioning process.

The configuration may be able to be completed more quickly if it is already started during the positioning process, in this case more computing power and more energy may be required than if further configuration is only started after the target position is reached.

During the further configuration process, the further coupling surface segments 204 (optionally also the first coupling surface segment 204_20 and the second coupling surface segment 204_5) can each be brought into one of the switching states as a test and the total capacitance C1+C2 can be measured. In this case, it can be done sequentially, i.e. between two successive measurements of the total capacitance C1+C2, in each case only changing the switching state for one of the coupling surface segments 204. Alternatively, it can be done with an (at least partially) parallelization, for example by changing the switching state for two or more of the coupling surface segments 204 between two successive measurements of the total capacitance C1+C2. The sequential and the parallel approach can be combined, for example a sequential procedure for testing some of the coupling surface segments 204, and a parallel procedure for other coupling surface segments 204.

In various exemplary aspects, all coupling surface segments 204 can be tested. In various exemplary aspects, testing some coupling surface segments 204 can be dispensed with, for example taking into account an assumption that the coupling surface areas 106 form contiguous surfaces in each case. In the example from FIG. 2B, based on this, for example after testing the coupling surface segments 204_19 and 204_23 and the result that connecting each of the coupling surface segments 204_19 and 204_23 does not further increase the total capacitance C1+C2, it could correspondingly be beyond an area which is covered by the coupling surface area 106_1. In the case of a contiguous coupling surface area 106_1, the coupling surface segment 204_22 is therefore also outside the area which is covered by the coupling surface area 106_1 and can be brought into the "unconnected" switching state for normal operation without prior testing.

In various exemplary aspects, the control circuit 332 can further be set up, based on the determined sums C1+C2 of the capacitances of the first capacitor K1 and the second capacitor K2, and optionally taking into account the signal quality or a minimum number of coupling surface segments 204 for reaching a maximum or approximately maximum total capacitance C1+C2, to provide an associated configuration as a configuration for a normal operating mode and to switch to the normal operating mode.

This state is represented in FIG. 2B. In this case, the coupling surface segments 204_14, 204_15, 204_17, 204_18, 204_20 and 204_21 are connected to the first supply voltage V1, the coupling surface segments 204_5, 204_6, 204_8, 204_9, 204_11 and 204_12 to the second supply voltage V2, and the remaining coupling surface segments are disconnected from the voltage supply (open/unconnected). If the capacitive coupling means 100P were arranged shifted in one of the arrow directions, the circuitry (V1, V2, open) of the coupling surface segments 204 would be adjusted if necessary. In the configuration represented, which is set up for the normal operating mode, the total capacitance is maximized (and additionally the signal quality, since the coupling surface segments 204 which are not covered by the coupling surface areas 106_1, 106_2 are unconnected).

The capacitive coupling device 200B can be set up to exchange data with the capacitive coupling means 100P in the normal operating mode.

In various exemplary aspects, a design (not represented) with three coupling surface segments 204, of which a first coupling surface segment can be fixedly (i.e. not switchably) or switchably connected as described previously to the first supply voltage V1, a second coupling surface segment can be fixedly (i.e. not switchably) or switchably connected as described previously to the second supply voltage V2, and a third switchable coupling surface segment which can be arranged between the first coupling surface segment and the second coupling surface segment, for example, can already result in an improved energy and data transmission compared with the known systems.

In various exemplary aspects, more than three coupling surface segments 204 may be provided. Thereof, at least one, typically all or all but two, can be provided to be switchable between the three switching states described previously.

Depending on expected manufacturing tolerances or positioning inaccuracies in the case of the capacitive coupling means 100P, the coupling surface segments 204 may be designed differently in terms of number, form and arrangement.

The coupling surface segments 204 may be different in size, for example.

In various exemplary aspects, the at least three coupling surface segments 204 may include two larger coupling surface segments and at least one smaller coupling surface segment which is smaller than the larger coupling surface segments.

A size ratio of the larger coupling surface segments to the smaller coupling surface segments can be at least 1.5:1 in various exemplary aspects.

The smaller coupling surface segment 204 or at least one of the smaller coupling surface segments 204 can be arranged laterally adjacent to at least one of the larger coupling surface segments.

In various exemplary aspects, the smaller coupling surface segment 204 or at least one of the smaller coupling surface segments 204 can be arranged between the two larger coupling surface segments 204.

In various exemplary aspects, the smaller coupling surface segment 204 or at least one of the smaller coupling surface segments 204 can be arranged outside an intermediate area of the two larger coupling surface segments 204.

In various exemplary aspects, at least one of the smaller coupling surface segments can be arranged between the two larger coupling surface segments and at least one further of the smaller coupling surface segments can be arranged outside an intermediate area of the two larger coupling surface segments.

In various exemplary aspects, the at least three coupling surface segments 204 can be four or more coupling surface segments 204 which are arranged in a matrix form.

One exemplary matrix arrangement with different sized coupling surface segments 204 is represented in FIG. 2A and FIG. 2B.

For example, in an area in which a transition from the first coupling surface area 106_1 to the second coupling surface area 106_2 is expected in the case of a positioned capacitive coupling means 100P, the coupling surface segments 204 (at least in the transitional direction) can be smaller than in other positions. In the example, the coupling surface segments 204_10, ..., 204_15 are smaller in a y direction than the coupling surface segments 204_7, 204_8, 204_9, 204_16, 204_17, 204_18, and these in turn are smaller than the coupling surface segments 204_4, 204_5, 204_6, 204_19, 204_20, 204_21.

For example, the coupling surface segments 204 can be smaller in an edge area than in a central area. In the example, the coupling surface segments 204_1, 204_4, 204_7, 204_10, 204_13, 204_16, 204_19, 204_22 and, 204_3, 204_6, 204_9, 204_12, 204_15, 204_18, 204_21, 204_24 are smaller in an x direction than the coupling surface segments 204_2, 204_5, 204_8, 204_11, 204_14, 204_17, 204_20, 204_23, and the coupling surface segments 204_1, 204_2, 204_3 and, 204_22, 204_23, 204_24 are smaller in a y direction than the adjacent coupling surface segments 204_4, 204_5, 204_6 or, 204_19, 204_20, 204_21 in the y direction.

FIG. 5 shows a flow diagram 500 of a method for operating a capacitive coupling device according to various exemplary aspects.

The capacitive coupling device can be set up for capacitive coupling to a capacitive coupling means which can be arranged on the capacitive coupling device.

The capacitive coupling device can have a first coupling surface, which has at least three coupling surface segments which are arranged separated from one another, and a voltage supply for providing a first supply voltage and a second supply voltage which is different therefrom.

The method can include selectively connecting at least one, for example each, of the coupling surface segments to the first supply voltage or to the second supply voltage in an electrically conductive manner or disconnecting the coupling surface segment from the control circuit (510).

The method can further include forming a first capacitor from the coupling surface segments connected to the first supply voltage and a first coupling surface area of the capacitive coupling means (520) and forming a second capacitor from the coupling surface segments connected to the second supply voltage and a second coupling surface area of the capacitive coupling means (530).

Some exemplary aspects are specified hereinafter in a summarized manner.

Exemplary aspect 1 is a capacitive coupling device for capacitive coupling to a capacitive coupling means which can be arranged on the capacitive coupling device. The capacitive coupling device can have a first coupling surface, which has at least three coupling surface segments which are arranged separated from one another, a voltage supply for providing a first supply voltage and a second supply voltage which is different therefrom, and a control circuit, which is set up to connect at least one, for example each, of the coupling surface segments selectively to the first supply voltage or to the second supply voltage in an electrically conductive manner or to disconnect it from the control circuit in such a way that the coupling surface segments connected to the first supply voltage form, with a first coupling surface area of the capacitive coupling means, a first capacitor, and the coupling surface segments connected to the second supply voltage form, with a second coupling surface area of the capacitive coupling means, a second capacitor.

Exemplary aspect 2 is a capacitive coupling device according to exemplary aspect 1, which is set up to exchange data between the capacitive coupling device and the capacitive coupling means and to provide energy to the capacitive coupling means by means of the capacitive coupling.

Exemplary aspect 3 is a capacitive coupling device according to exemplary aspect 1 or 2, wherein the control circuit is set up to detect an approach of the capacitive coupling means.

Exemplary aspect 4 is a capacitive coupling device according to one of exemplary aspects 1 to 3, wherein the control circuit is further set up to bring the capacitive coupling device into a configuration mode, in the configuration mode, to bring at least one of the coupling surface segments into the three switching states: connected to the first supply voltage—connected to the second supply voltage—disconnected from the control circuit, and to determine a sum of the capacitances of the first capacitor and the second capacitor for each of the three switching states.

Exemplary aspect 5 is a capacitive coupling device according to exemplary aspects 3 and 4, wherein the control circuit is further set up, after detecting the approach of the capacitive coupling means, to bring the capacitive coupling device into the configuration mode.

Exemplary aspect 6 is a capacitive coupling device according to exemplary aspect 4 or 5, wherein the control circuit is further set up, based on the determined sums of the capacitances of the first capacitor and the second capacitor, to provide an associated configuration as a configuration for a normal operating mode.

Exemplary aspect 7 is a capacitive coupling device according to exemplary aspect 6, which is set up to exchange date with the capacitive coupling means in the normal operating mode.

Exemplary aspect 8 is a capacitive coupling device according to one of exemplary aspects 1 to 7, wherein the coupling surface segments are different in size.

Exemplary aspect 9 is a capacitive coupling device according to one of exemplary aspects 1 to 8, wherein the at least three coupling surface segments include two larger coupling surface segments and at least one smaller coupling surface segment which is smaller than the larger coupling surface segments, wherein a size ratio of the larger coupling surface segments to the smaller coupling surface segments is optionally at least 1.5:1.

Exemplary aspect 10 is a capacitive coupling device according to exemplary aspect 9, wherein the smaller coupling surface segment or at least one of the smaller coupling surface segments is arranged laterally adjacent to at least one of the larger coupling surface segments.

Exemplary aspect 11 is a capacitive coupling device according to exemplary aspect 9 or 10, wherein the smaller coupling surface segment or at least one of the smaller coupling surface segments is arranged between the two larger coupling surface segments.

Exemplary aspect 12 is a capacitive coupling device according to exemplary aspect 9 or 10, wherein the smaller coupling surface segment or at least one of the smaller coupling surface segments is arranged outside an intermediate area of the two larger coupling surface segments.

Exemplary aspect 13 is a capacitive coupling device according to exemplary aspect 9 or 10, wherein at least one of the smaller coupling surface segments is arranged between the two larger coupling surface segments and at least one further of the smaller coupling surface segments is arranged outside an intermediate area of the two larger coupling surface segments.

Exemplary aspect 14 is a capacitive coupling device according to one of exemplary aspects 1 to 13, wherein the at least three coupling surface segments are four or more coupling surface segments which are arranged in a matrix form.

Exemplary aspect 15 is a capacitive coupling device according to one of exemplary aspects 1 to 14, which is designed as an electronic inhalation device.

Exemplary aspect 16 is a capacitive coupling device according to exemplary aspect 15, wherein the capacitive coupling means is a tank means for the electronic inhalation device.

Exemplary aspect 17 is a capacitive coupling system. The capacitive coupling system can have a capacitive coupling device according to one of exemplary aspects 1 to 16 and a capacitive coupling device for capacitive coupling to a capacitive coupling means which can be arranged on the capacitive coupling device.

Exemplary aspect 18 is a capacitive coupling system according to exemplary aspect 17, wherein the control circuit is further set up to carry out an authentication of the capacitive coupling means by means of the capacitive coupling.

Exemplary aspect 19 is a method for operating a capacitive coupling device for capacitive coupling to a capacitive coupling means which can be arranged on the capacitive coupling device, wherein the capacitive coupling device has a first coupling surface, which has at least three coupling surface segments which are arranged separated from one another, and a voltage supply for providing a first supply voltage and a second supply voltage which is different therefrom. The method can include selectively connecting at least one, for example each, of the coupling surface segments to the first supply voltage or to the second supply voltage in an electrically conductive manner or disconnecting the coupling surface segment from the control circuit, forming a first capacitor from the coupling surface segments connected to the first supply voltage and a first coupling surface area of the capacitive coupling means, and forming a second capacitor from the coupling surface segments connected to the second supply voltage and a second coupling surface area of the capacitive coupling means.

Exemplary aspect 20 is a method according to exemplary aspect 19, which further includes exchanging data between the capacitive coupling device and the capacitive coupling means and providing energy by means of the capacitive coupling.

Exemplary aspect 21 is a method according to exemplary aspect 19 or 20, which further includes detecting an approach of the capacitive coupling means.

Exemplary aspect 22 is a method according to one of exemplary aspects 19 to 21, which further includes bringing the capacitive coupling device into a configuration mode, in the configuration mode, bringing at least one of the coupling surface segments into the three switching states: connected to the first supply voltage—connected to the second supply voltage—disconnected from the control circuit, and determining a sum of the capacitances of the first capacitor and the second capacitor for each of the three switching states.

Exemplary aspect 23 is a method according to exemplary aspects 21 and 22, which further includes, after detecting the approach of the capacitive coupling means, bringing the capacitive coupling device into the configuration mode.

Exemplary aspect 24 is a method according to exemplary aspect 22 or 23, which further includes providing a configuration for a normal operating mode based on the determined sums of the capacitances of the first capacitor and the second capacitor and the associated configurations.

Exemplary aspect 25 is a method according to exemplary aspect 24, which further includes exchanging data with the capacitive coupling means in the normal operating mode.

Exemplary aspect 26 is a method according to one of exemplary aspects 19 to 25, wherein the coupling surface segments are different in size.

Exemplary aspect 27 is a method according to one of exemplary aspects 19 to 26, wherein the at least three coupling surface segments include two larger coupling surface segments and at least one smaller coupling surface segment which is smaller than the larger coupling surface segments, wherein a size ratio of the larger coupling surface segments to the smaller coupling surface segments is optionally at least 1.5:1.

Exemplary aspect 28 is a method according to exemplary aspect 27, wherein the smaller coupling surface segment or at least one of the smaller coupling surface segments is arranged laterally adjacent to at least one of the larger coupling surface segments.

Exemplary aspect 29 is a method according to exemplary aspect 27 or 28, wherein the smaller coupling surface segment or at least one of the smaller coupling surface segments is arranged between the two larger coupling surface segments.

Exemplary aspect 30 is a method according to one of exemplary aspects 27 to 29, wherein the smaller coupling surface segment or at least one of the smaller coupling surface segments is arranged outside an intermediate area of the two larger coupling surface segments.

Exemplary aspect 31 is a method according to one of exemplary aspects 27 to 29, wherein at least one of the smaller coupling surface segments is arranged between the two larger coupling surface segments and at least one further of the smaller coupling surface segments is arranged outside an intermediate area of the two larger coupling surface segments.

Exemplary aspect 32 is a method according to one of exemplary aspects 19 to 31, wherein the at least three coupling surface segments are four or more coupling surface segments which are arranged in a matrix form.

Exemplary aspect 33 is a method according to one of exemplary aspects 19 to 32, wherein the capacitive coupling device is designed as an electronic inhalation device.

Exemplary aspect 34 is a method according to exemplary aspect 33, wherein the capacitive coupling means is a tank means for the electronic inhalation device.

Further advantageous configurations of the device are set forth in the description of the method, and vice versa.

The invention claimed is:

1. A capacitive coupling device for capacitive coupling to a capacitive coupling means which is arrangeable on the capacitive coupling device, the capacitive coupling device comprising:
   a first coupling surface, which has at least three coupling surface segments arranged separated from one another;
   a voltage supply configured to provide a first supply voltage and a second supply voltage which is different therefrom; and
   a control circuit, which is configured to selectively (i) connect at least one of the coupling surface segments to the first supply voltage in an electrically-conductive manner via a first switching state, (ii) connect the at least one of the coupling surface segments to the second supply voltage in an electrically-conductive manner via a second switching state, or (iii) disconnect the at least one of the coupling surface segments from the control circuit via a third switching state, wherein the one or more coupling surface segments when connected to the first supply voltage form, with a first coupling surface area of the capacitive coupling means, a first capacitor, wherein the one or more coupling surface segments when connected to the second supply voltage form, with a second coupling surface area of the capacitive coupling means, a second capacitor, and wherein the control circuit is further configured to determine a sum of capacitances formed by the first capacitor and the second capacitor for each one of the first, the second, and the third switching state, and to subsequently place the at least one of the coupling surface segments in one of the first, the second, or the third switching state corresponding to the one of the three switching states for which a highest sum of capacitances is determined.

2. The capacitive coupling device as claimed in claim 1, wherein the capacitive coupling device is arranged to exchange data between the capacitive coupling device and the capacitive coupling means and to provide energy to the capacitive coupling means via the capacitive coupling.

3. The capacitive coupling device as claimed in claim 1, wherein the control circuit is arranged to detect an approach of the capacitive coupling means.

4. The capacitive coupling device as claimed in claim 1, wherein the control circuit is further configured to bring the capacitive coupling device into a configuration mode
to determine the sum of capacitances formed by the first capacitor and the second capacitor for each one of the three switching states.

5. The capacitive coupling device as claimed in claim 1, wherein the coupling surface segments are different in size.

6. The capacitive coupling device as claimed in claim 1, wherein the at least three coupling surface segments comprise two first coupling surface segments and a second coupling surface segment that is smaller than the two first coupling surface segments, and
wherein a size ratio of the two first coupling surface segments to the second coupling surface segment is at least 1.5:1.

7. The capacitive coupling device as claimed in claim 6, wherein the second coupling surface segment is arranged laterally adjacent to at least one of the two first coupling surface segments.

8. The capacitive coupling device as claimed in claim 6, wherein the second coupling surface segment is arranged between the two first coupling surface segments.

9. The capacitive coupling device as claimed in claim 6, wherein the second coupling surface segment is arranged outside an intermediate area of the two first coupling surface segments.

10. The capacitive coupling device as claimed in claim 6, wherein the at least three coupling surface segments comprise a third coupling surface segment that is smaller than the two first coupling surface segments,
wherein the second coupling surface segment is arranged between the two first coupling surface segments, and
wherein the third coupling surface segment is arranged outside an intermediate area of the two first coupling surface segments.

11. The capacitive coupling device as claimed in claim 1, wherein the at least three coupling surface segments comprise four or more coupling surface segments that are arranged in a grid form.

12. A capacitive coupling system, comprising:
a first capacitive coupling device as claimed in claim 1; and
a second capacitive coupling device for capacitive coupling to a second capacitive coupling means, which is arrangeable on the second capacitive coupling device.

13. An electronic inhalation device, comprising:
a capacitive coupling device as claimed in claim 1.

14. The capacitive coupling device of claim 1, wherein the control circuit is configured to subsequently place the at least one of the coupling surface segments in one of the first, the second, or the third switching state corresponding to the one of the three switching states for which a highest sum of capacitances is determined corresponding to a smallest number of coupling surface segments being coupled to the first supply voltage or to the second supply voltage in an electrically-conductive manner.

15. The capacitive coupling device of claim 1, wherein the control circuit is further configured to determine, for each one of the at least three coupling surface segments, a sum of capacitances formed by the first capacitor and the second capacitor for each one of the first, the second, and the third switching state by adjusting, between successive determinations, a switching state of two or more of the at least three coupling surface segments.

16. A method for operating a capacitive coupling device for capacitive coupling to a capacitive coupling means which is arrangeable on the capacitive coupling device, wherein the capacitive coupling device has a first coupling surface, which has at least three coupling surface segments arranged separated from one another, and a voltage supply configured to provide a first supply voltage and a second supply voltage which is different therefrom, the method comprising:
selectively (i) connecting at least one of the coupling surface segments to the first supply voltage in an electrically-conductive manner via a first switching state, (ii) connecting the at least one of the coupling surface segments to the second supply voltage in an electrically-conductive manner via a second switching state, or (iii) disconnecting the coupling surface segment from the control circuit via a third switching state;
forming a first capacitor from (i) one or more of the coupling surface segments, when connected to the first supply voltage, and (ii) a first coupling surface area of the capacitive coupling means;
forming a second capacitor from (i) one or more of the coupling surface segments, when connected to the second supply voltage, and (ii) a second coupling surface area of the capacitive coupling means;
determining a sum of capacitances formed by the first capacitor and the second capacitor for each one of the first, the second, and the third switching state; and
subsequently placing the at least one of the coupling surface segments in one of the first, the second, or the third switching state corresponding to the one of the three switching states for which a highest sum of capacitances is determined.

17. The method as claimed in claim 16, further comprising:
upon subsequently placing the at least one of the coupling surface segments in one of the first, the second, or the third switching state, exchanging data between the capacitive coupling device and the capacitive coupling means and providing energy via the capacitive coupling.

18. The method as claimed in claim 16, further comprising:
   detecting an approach of the capacitive coupling means.

19. The method as claimed in claim 16, further comprising:
   bringing the capacitive coupling device into a configuration mode for
   determining the sum of the capacitances formed by the first capacitor and the second capacitor for each one of the three switching states.

20. The method as claimed in claim 19, further comprising:
   after detecting an approach of the capacitive coupling means, bringing the capacitive coupling device into the configuration mode.

21. The method as claimed in claim 19,
   wherein the act of subsequently placing the at least one of the coupling surface segments in one of the first, the second, or the third switching state comprises:
   bringing the capacitive coupling device into a normal operating mode.

22. The method as claimed in claim 21, further comprising:
   exchanging data with the capacitive coupling means in the normal operating mode.

\* \* \* \* \*